United States Patent
Lee et al.

(10) Patent No.: US 8,733,772 B2
(45) Date of Patent: May 27, 2014

(54) ANTI-ROLL APPARATUS FOR VEHICLE

(71) Applicant: Hyundai Motor Company, Seoul (KR)

(72) Inventors: Un Koo Lee, Seoul (KR); Sung Bae Jang, Suwon-si (KR); Daesik Ko, Hwaseong-gun (KR); Jong Min Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/728,667

(22) Filed: Dec. 27, 2012

(65) Prior Publication Data

US 2013/0313800 A1 Nov. 28, 2013

(30) Foreign Application Priority Data

May 25, 2012 (KR) ........................ 10-2012-0056313

(51) Int. Cl.
*B60G 21/073* (2006.01)

(52) U.S. Cl.
USPC .................................................. 280/124.106

(58) Field of Classification Search
USPC .......... 280/5.502, 5.503, 5.506, 5.507, 5.508, 280/5.509, 124.109, 124.134, 124.135, 280/124.16, 124.161, 509, 124.106, 280/124.107; 267/64.28, 187, 191
See application file for complete search history.

(56) References Cited

U.S. PATENT DOCUMENTS

| 2,126,084 | A | * | 8/1938 | Balz | 267/249 |
| 3,598,385 | A | * | 8/1971 | Parsons, Jr. | 267/30 |
| 3,977,694 | A | * | 8/1976 | Nordstrom | 280/5.509 |
| 4,103,920 | A | * | 8/1978 | Smith | 280/5.509 |
| 4,534,575 | A | * | 8/1985 | Grove et al. | 280/124.136 |
| 4,740,013 | A | * | 4/1988 | Pierce, Jr. | 280/124.102 |
| 4,815,762 | A | * | 3/1989 | Jurr | 280/124.141 |
| 4,825,958 | A | * | 5/1989 | Kelderman | 172/413 |
| 5,505,479 | A | * | 4/1996 | Lee | 280/124.107 |
| 5,558,361 | A | * | 9/1996 | Shin | 280/124.15 |
| 5,772,224 | A | * | 6/1998 | Tong | 280/5.509 |
| 6,726,229 | B2 | * | 4/2004 | Smith et al. | 280/124.141 |
| 7,077,407 | B2 | * | 7/2006 | Shin | 280/124.107 |
| 7,628,414 | B2 | * | 12/2009 | Dobson et al. | 280/124.106 |
| 2009/0302555 | A1 | | 12/2009 | Kesselgruber | |
| 2010/0327549 | A1 | * | 12/2010 | Barth et al. | 280/124.106 |
| 2011/0309592 | A1 | * | 12/2011 | Chan et al. | 280/124.106 |
| 2012/0061934 | A1 | * | 3/2012 | Scaduto | 280/124.106 |

FOREIGN PATENT DOCUMENTS

| JP | 10-024718 A | 1/1998 |
| JP | 2953728 B2 | 7/1999 |
| JP | 2006-521239 A | 9/2006 |
| JP | 2010-042798 A | 2/2010 |
| KR | 10 2005 0117745 A | 12/2005 |

* cited by examiner

*Primary Examiner* — Paul N Dickson
*Assistant Examiner* — Robert A Coker
(74) *Attorney, Agent, or Firm* — Morgan, Lewis & Bockius LLP

(57) ABSTRACT

An anti-roll apparatus for a vehicle may include lower arms installed at both sides of a sub frame through hinges respectively, a reaction force cylinder formed at a center of the sub frame, wherein piston rods may be installed at both sides thereof respectively and interact by reaction force of compressible fluid filled inside a sealed cylinder housing, and push rods connecting the respective piston rod of the reaction force cylinder and the respective lower arms.

12 Claims, 5 Drawing Sheets

ANTI-ROLL APPARATUS FOR VEHICLE

CROSS-REFERENCE TO RELATED APPLICATION

The present application claims priority to Korean Patent Application No. 10-2012-0056313 filed on May 25, 2012, the entire contents of which is incorporated herein for all purposes by this reference.

BACKGROUND OF THE INVENTION

1. Field of the Invention

The present invention relates to an anti-roll apparatus for a vehicle, and more particularly, to an anti-roll apparatus for a vehicle for controlling roll of a vehicle when the vehicle turns.

2. Description of Related Art

In general, a suspension system for a vehicle is an apparatus for preventing a vehicle body or freight from being damaged and improving ride comfort by controlling so that vibration or impact which a vehicle axle receives from a road during running is not directly transmitted to the vehicle body by connecting the vehicle axle and the vehicle body.

The suspension system needs to absorb behavior, such as vertical bounce, rolling, pitching, and yawing, generated while driving the vehicle.

Particularly, rolling of a vehicle exerts large influence on safety when the vehicle turns, so that a stabilizer bar is generally applied in order to suppress rolling.

However, the stabilizer bar in the related art is disadvantageous in terms of ride comfort due to friction with a mounting bush for installing the stabilizer bar in the vehicle body and roll strength is always constant regardless of a size of a lateral load (that is, a size of a roll angle), such that stability of a vehicle may not be guaranteed in a limit situation.

Further, there is a drawback in that abnormal sound is generated due to deformation and abrasion of lubricating rubber inside the mounting bush.

In order to solve a problem of the stabilizer bar, an anti-roll apparatus using a leaf spring illustrated in FIG. 1 has been developed.

Referring to FIG. 1, the anti-roll apparatus includes lower arms 103 installed at both sides of a sub frame 101 and a rotary mounter 105 provided at a center of the sub frame 101.

A spring unit including the leaf spring 107 is rotatably installed in the rotary mounter 105 while passing through a center of the rotary mounter 105.

Both ends of the leaf spring 107 are connected through the respective lower arms 103 and push rods 109.

That is, the anti-roll apparatus suppresses roll by using elasticity of the leaf spring 107 when the roll is generated, without generating geometry interference with the existing suspension system, and effectively suppresses the roll of the vehicle by varying strength for the roll in proportion to a lateral load.

However, because a span in front and rear directions of the leap spring 107 is long in the anti-roll apparatus for a vehicle in the related art, interference with the vehicle body (that is, a tire well TW) or a peripheral component (that is, a fuel tank TK) is generated, so that there is a drawback in terms of a layout.

Further, a total length of the leaf spring 107 cannot elongate due to limitation of the layout, so that it is disadvantageous in terms of energy absorption capability, and an input angle of loads transmitted from a push rod 109 and a tire T are relatively large, so that there is a drawback in that load transmission efficiency is relatively low.

Further, there is a drawback in that a separate bracket B for fastening the push rod 109 and the leaf spring 107 by an assembling angle needs to be included.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an anti-roll apparatus for a vehicle for controlling roll of a vehicle by reaction force of compressible fluid when the vehicle turns by using the compressible fluid filled inside a sealed reaction force cylinder.

Further, various aspects of the present invention are directed to providing an anti-roll apparatus for a vehicle having advantages of compensating for impact and durability strength generated due to the usage of the existing elastic body, freely tuning strength by adjusting initial pressure of compressible fluid, improving member strength through integration with the frame by including a member inside the sub frame, and solving a layout issue with a peripheral component.

In an aspect of the present invention, an anti-roll apparatus for a vehicle, may include lower arms installed at both sides of a sub frame through hinges respectively, a reaction force cylinder formed at a center of the sub frame, wherein piston rods are installed at both sides thereof respectively and interact by reaction force of compressible fluid filled inside a sealed cylinder housing, and push rods connecting the respective piston rod of the reaction force cylinder and the respective lower arms.

The sub frame may include an opening at a center at which the reaction force cylinder is installed, and an upper cover is assembled with the opening to protect the reaction force cylinder.

The reaction force cylinder may include the cylinder housing with a sealed interior, a guide wall formed at a center of the cylinder housing in a longitudinal direction thereof and dividing an inner space of the cylinder housing into front and rear chambers fluid-communicating with each other at both ends thereof, and the piston rods arranged in the front and rear chambers in one direction and the other direction respectively with respect to the guide wall, wherein pistons formed at an inner end of the respective piston rods in the front and rear chambers are guided along the guide wall and the cylinder housing, and an outer end of the respective piston rods is coupled to the push rods.

The cylinder housing may include a lower housing including the guide wall formed at the center in a longitudinal direction thereof, and including a first rod hole at one side surface in correspondence to the front chamber so that one of the piston rods is operated therethrough, and a second rod hole at the other side surface in correspondence to the rear chamber so that the other of the piston rods is operated therethrough, a housing cover installed on the lower housing, and sealing covers installed at the respective rod holes and maintaining sealing between the rod holes and the piston rods.

An air-pressure adjusting valve is installed in the housing cover.

A sealing member is installed between the cylinder housing and the piston rod.

An outer end of the respective push rods is connected to an extension end formed upwardly at an inner end of the lower arm through a ball joint.

An inner end of the respective push rods is connected to a corresponding piston rod of the reaction force cylinder through a joint bush.

The compressible fluid is air.

In another aspect of the present invention, an anti-roll apparatus for a vehicle, may include lower arms respectively installed at both sides of a sub frame through hinges, piston rods connected to respective lower arms through a corresponding push rod, reaction force cylinder may include d in the sub frame, a guide wall dividing an interior of the reaction force cylinder into two chambers and may include d inside the reaction force cylinder so that ends of the two chambers fluid-communicate with each other, and pistons slidably may include d in the respective chambers and connected to the piston rods.

The reaction force cylinder may include rod holes in which the respective piston rods are inserted, wherein the rod holes are provided with the piston rods and sealing covers configured to maintain sealing between the piston rods and the rod holes.

An air-pressure adjustment valve configured to adjust pressure inside the reaction force cylinder is installed in the reaction force cylinder.

Each of the push rods is connected to an extension end formed at an inner end of a corresponding lower arm through a ball joint.

The corresponding push rod is connected to a corresponding piston rod through a joint bush.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
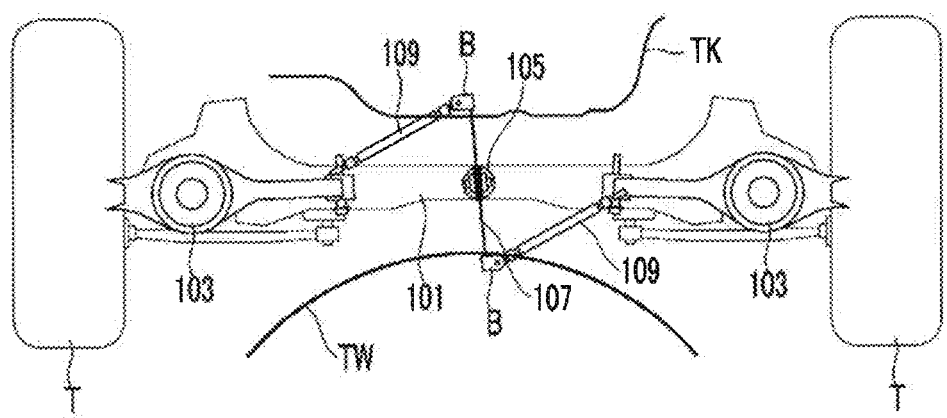
FIG. 1 is a perspective view of a general anti-roll apparatus for a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, a part irrelevant to description will be omitted in order to clearly describe an exemplary embodiment of the present invention.

Figure 2:
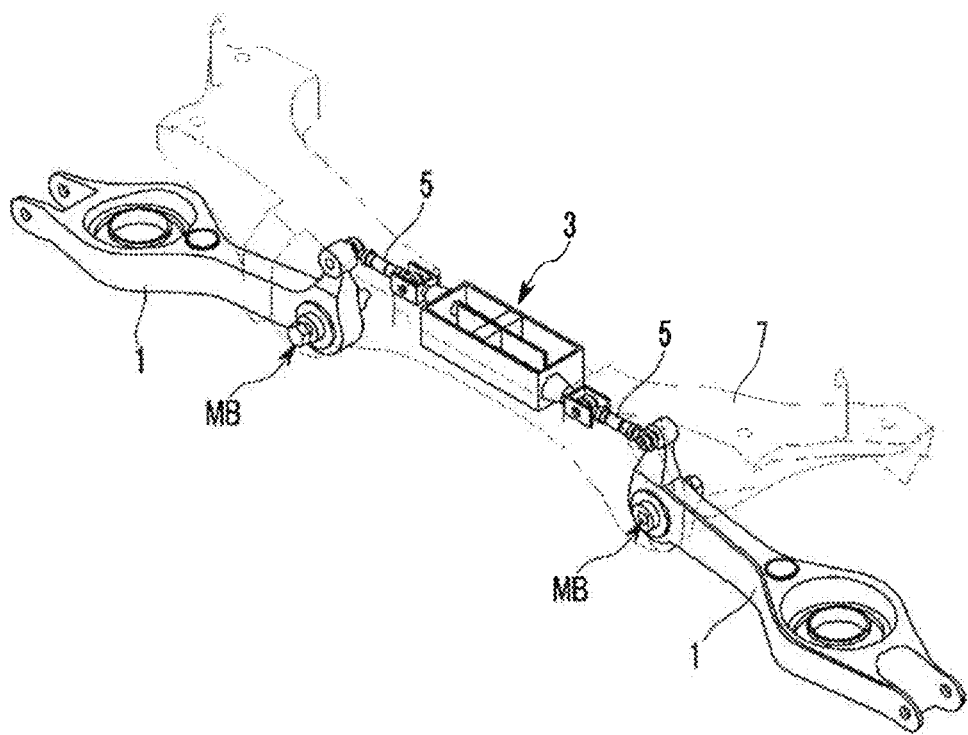
FIG. 2 is a projective perspective view of an anti-roll apparatus for a vehicle according to an exemplary embodiment of the present invention.
Figure 3:
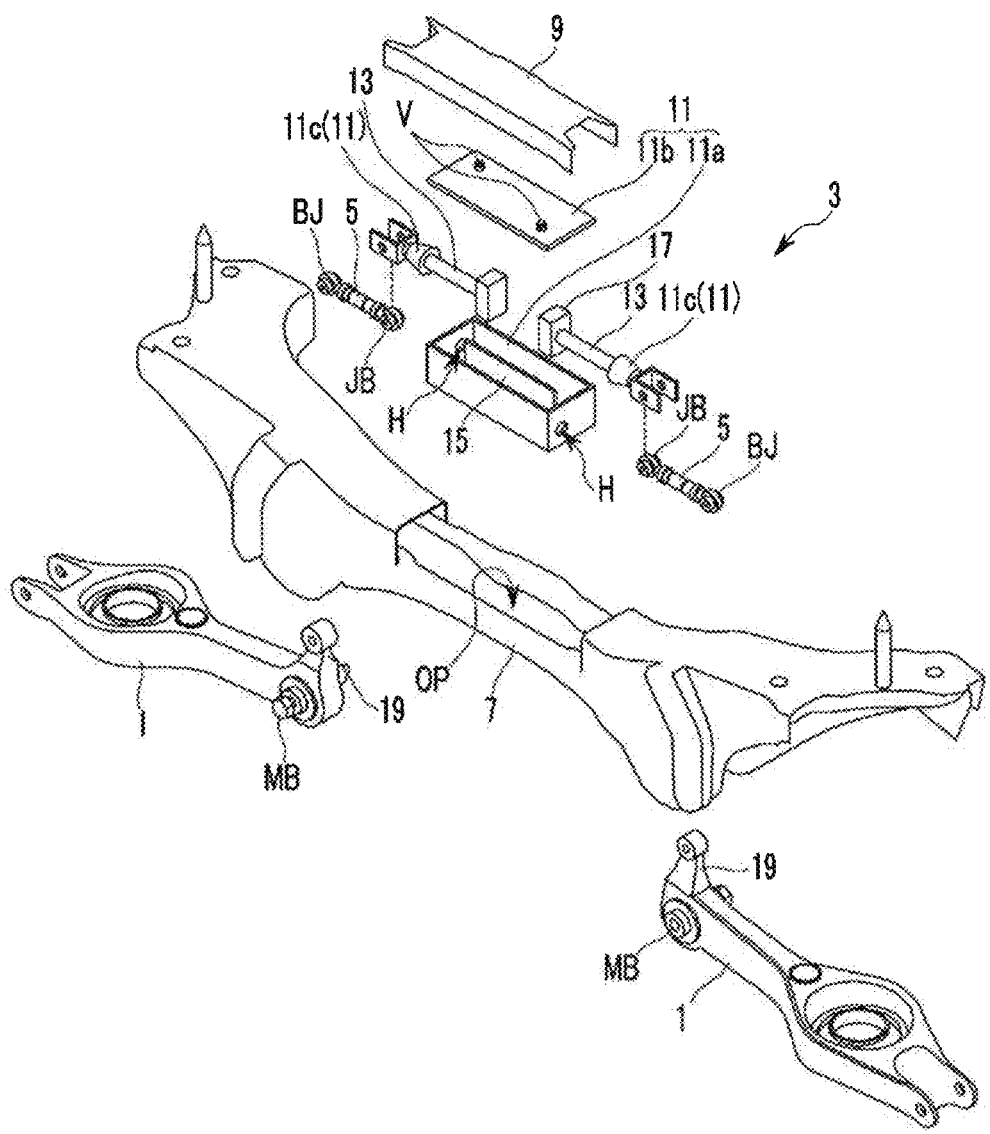
FIG. 3 is an exploded perspective view of an anti-roll apparatus for a vehicle according to an exemplary embodiment of the present invention.
Figure 4:
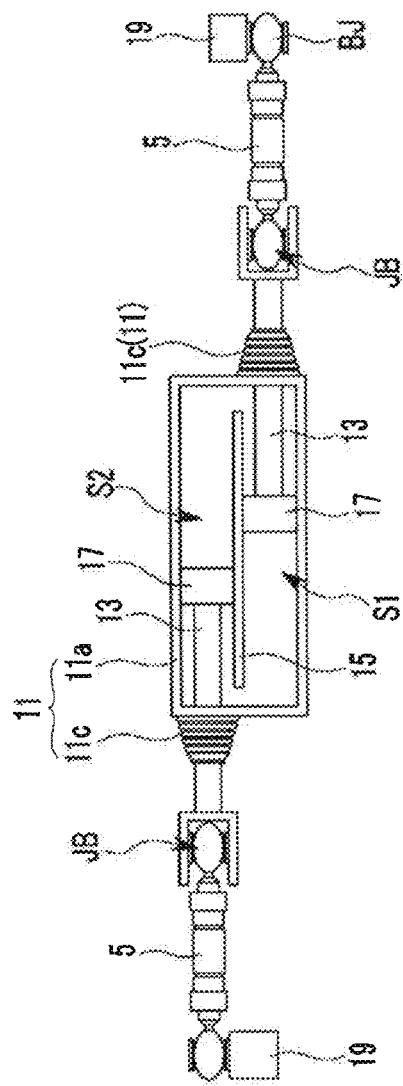
FIG. 4 is a plan view of an anti-roll apparatus for a vehicle according to an exemplary embodiment of the present invention.

FIG. 2 is a projective perspective view of an anti-roll apparatus for a vehicle according to an exemplary embodiment of the present invention, FIG. 3 is an exploded perspective view of an anti-roll apparatus for a vehicle according to an exemplary embodiment of the present invention, and FIG. 4 is a plan view of an anti-roll apparatus for a vehicle according to an exemplary embodiment of the present invention.

Referring to FIGS. 2 and 3, an anti-roll apparatus for a vehicle according to an exemplary embodiment of the present invention includes lower arms 1, a reaction force cylinder 3, and push rods 5.

The lower arms 1 are hinge-coupled to lower sides of both ends of a sub frame 7 through mounting bushes (MB), and are connected to one side of knuckles.

Further, the reaction force cylinder 3 is installed at an inside center portion of the sub frame 7.

An opening OP is formed at a center of the sub frame 7 so as to install the reaction force cylinder 3, and an upper cover 9 is assembled with the opening OP to protect the reaction force cylinder 3.

Referring to FIGS. 3 and 4, the reaction force cylinder 3 includes a cylinder housing 11 having a sealed interior, a guide wall 15, and a piston rod 13.

Here, the cylinder housing 11 includes a lower housing 11a, a housing cover 11b, and sealing covers 11c, and the lower housing 11a, the housing cover 11b, and the sealing covers 11c are assembled with each other to form a sealed structure.

That is, the cylinder housing 11 includes the lower housing 11a, the housing cover 11b assembled on the lower housing 11a, and the sealing covers 11c for sealing in the operation of the piston rod 13, and the cylinder housing 11 has a structure including a sealed interior thereof.

The guide wall 15 is formed at a center of the lower housing 11a inside the cylinder housing 11 in a longitudinal direction, and the guide wall 15 divides an inner space S of the cylinder housing 11 into front and rear chambers S1 and S2 communicating with each other at respective ends thereof and guides the operation of the piston rod 13.

Further, the piston rods 13 are arranged in the front and rear chambers S1 and S2 in one direction and the other direction with respect to the guide wall 15. Further, pistons 17 guided along the guide wall 15 inside the front and rear chambers S1 and S2 are mounted to inner ends of the respective piston rods 13. Further, outer ends of the respective piston rods 13 are connected to the push rods 5.

In this case, a rod hole H is formed at one side surface of the lower housing 11a in correspondence to the front chamber S1 so that the piston rods 3 are operated, and a rod hole H is formed at the other side surface in correspondence to the rear chamber S2.

Here, the piston rods 13 are inserted in the rod holes H, respectively, and the sealing covers 11c are installed to maintain sealing between the piston rods 13 and the respective rod holes H.

Further, at least one air pressure adjusting valve V is installed in the housing cover 11b so that air pressure filled inside the cylinder housing 11 may be adjusted.

Further, the push rod 5 connects the respective rods 13 of the reaction force cylinder 3 and the respective lower arms 1 to receive a lateral load transmitted to the vehicle body through the lower arms 1 and transmit the received lateral load to the reaction force cylinder 3.

One end of the push rod 5 is connected to an extension end 19 extending from the lower arm 1 through a ball joint BJ.

Further, the other end of the push rod 5 is connected to the piston rod 13 of the reaction force cylinder 3 through a joint bush JB.

As described above, the anti-roll apparatus for the vehicle according to the exemplary embodiment of the present invention is provided with the reaction force cylinder 3 filled with the compressible fluid formed inside the sub frame 7, so that it is possible to decrease a span S in front and rear directions while improving energy absorbing capability, and thus interference between peripheral components is prevented and it is advantageous in terms of a layout.

Further, it is possible to improve load transmission efficiency by maintaining an input angle of the load transmitted from the push rods 5 and the tires in parallel, and it is possible to decrease the number of fastened components by directly fastening the push rods 5 and the piston rods 13 through the joint bushes BJ.

Hereinafter, an operation of the anti-roll apparatus for the vehicle according to the exemplary embodiment of the present invention will be described with reference to FIGS. 5(S1) and 5(S2).

Figure 5:
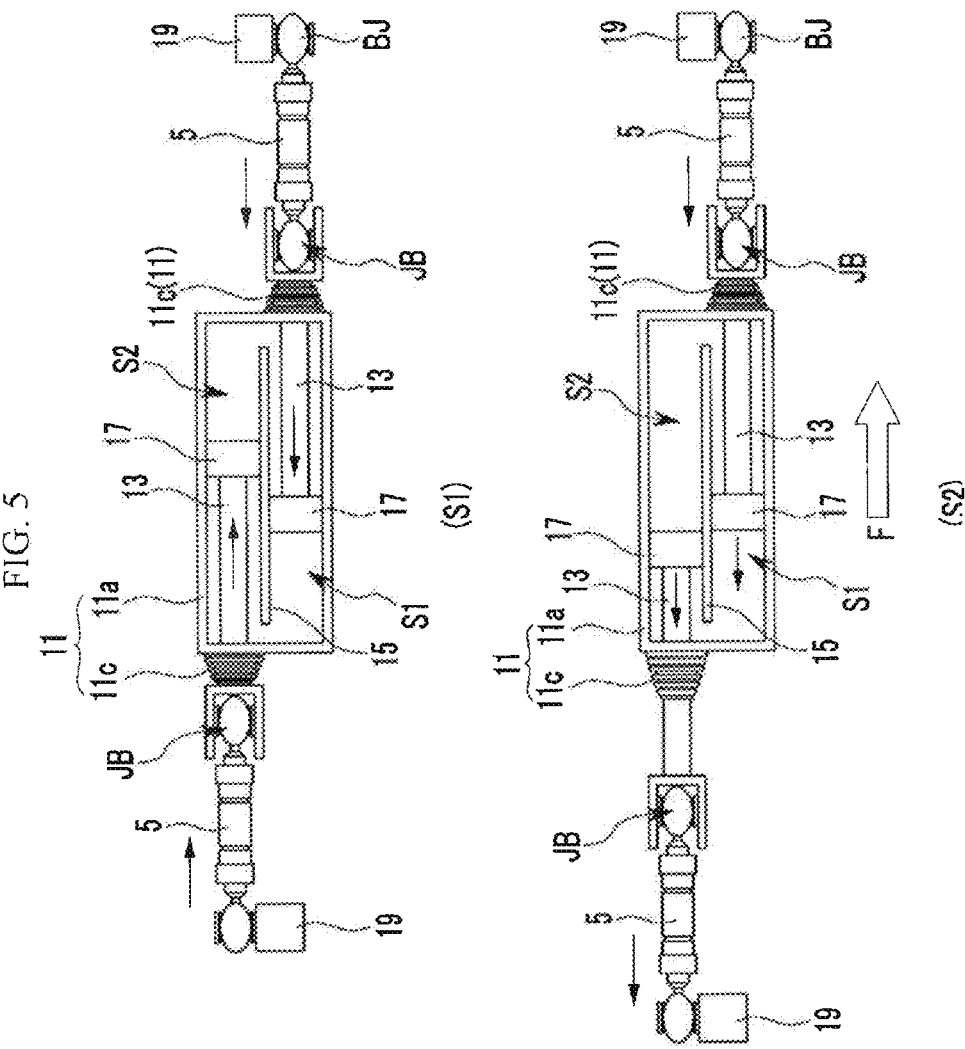
FIGS. 5(S1) and 5(S2) are views of a state of an anti-roll apparatus for a vehicle according to an exemplary embodiment of the present invention.

FIGS. 5(S1) and 5(S2) are views of a state of an operation of the anti-roll apparatus for the vehicle according to the exemplary embodiment of the present invention.

Referring to FIG. 5(S1), when the vehicle body bumps, the extension ends 19 of the lower arms 1 push the push rod 5 inwardly.

Then, the both piston rods 13 move into reverse toward inside the reaction force cylinder 3, and air inside the cylinder housing 11 circulates the front and rear chambers S1 and S2 by the respective pistons 17 to directly absorb bump operation force without generating reaction force.

This exhibits an effect of preventing aging of the bush and generation of an abnormal sound phenomenon by substituting the lubricating bush of the existing stabilizer with the air circulation.

It is a matter of course that when the vehicle body is rebound-operated, the extension ends 19 of the both lower arms 1 pull the push rods 5 outwardly, respectively, the both piston rods 13 go forward from the reaction force cylinder 3, and the air inside the cylinder housing 11 circulates the front and rear chambers S1 and S2 by the respective pistons 17, to directly absorb rebound operation force without generating reaction force.

Further, as illustrated in FIG. 5(S2), when the vehicle body rotationally behaves (turns), the extension end 19 of the lower arm 1 at a side at which the bump is generated pushes the corresponding push rod 5 inwardly, and reversely the extension end 19 of the lower arm 1 at a side at which rebound is generated pulls the corresponding push rod 5 outwardly.

Then, the both push rods 5 move in a direction in which the rebound is generated together with the respective piston rods 13. In this case, the air inside the front and rear chambers S1 and S2 applies reaction force F to the respective pistons 17 inside the cylinder housing 11 in the direction in which bump is generated while being compressed in the direction in which the rebound is generated.

Accordingly, the reaction force F according to the compression air inside the cylinder housing 11 is applied in a direction of suppressing roll of the vehicle body.

In the anti-roll apparatus for the vehicle according to the exemplary embodiment of the present invention, as a roll angle increases, roll strength is further enhanced, so that the roll of the vehicle is smoothly suppressed when the roll of large displacement is generated, thereby improving stability of driving and turning of the vehicle.

Since strength by the compressible fluid is in proportion to pressure and is inverse proportion to a volume, and strength is proportion to a square of displacement when the vehicle rotates, a characteristic of implementation of nonlinear strength exhibits.

In the meantime, since the air pressure filled inside the cylinder housing 11 may be adjusted through the air pressure adjusting valve V, it is possible to appropriately tune strength for each vehicle type, and thus target roll strength is implemented by using initial pressure by the compressible fluid, so that it is possible to apply a common component to various types of vehicles.

Further, according to the exemplary embodiment of the present invention, compression reaction force of the compressible fluid is used, so that there is an effect of compensating for impact generated due to the use of the existing elastic body and a limit of durability strength.

Further, according to the exemplary embodiment of the present invention, it is possible to improve load transmission efficiency by maintaining an input angle of a load transmitted from the push rods and the tires, decrease the number of fastened components for fastening with the push rods, and achieve a simple structure.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An anti-roll apparatus for a vehicle, comprising:
   lower arms installed at both sides of a sub frame through hinges respectively;
   a cylinder formed at a center of the sub frame, including:
   a sealed cylinder housing; and
   piston rods slidably installed at both sides of the sealed cylinder housing respectively and interacting by reaction force of compressible fluid filled inside the sealed cylinder housing; and
   push rods connecting the respective piston rods of the cylinder and the respective lower arms;

wherein the sub frame includes an opening at a center at which the cylinder is installed; and wherein an upper cover is assembled with the opening to protect the cylinder.

2. The anti-roll apparatus of claim 1, wherein the cylinder includes:

the cylinder housing with a sealed interior;

a guide wall formed at a center of the cylinder housing in a longitudinal direction thereof and dividing an inner space of the cylinder housing into front and rear chambers fluid-communicating with each other at both ends thereof; and the piston rods arranged in the front and rear chambers in one direction and the other direction respectively with respect to the guide wall, wherein pistons formed at an inner end of the respective piston rods in the front and rear chambers are guided along the guide wall and the cylinder housing, and an outer end of the respective piston rods is coupled to the push rods.

3. The anti-roll apparatus of claim 2, wherein the cylinder housing includes:

a lower housing including the guide wall formed at the center in a longitudinal direction thereof, and including a first rod hole at one side surface in correspondence to the front chamber so that one of the piston rods is operated therethrough, and a second rod hole at the other side surface in correspondence to the rear chamber so that the other of the piston rods is operated therethrough;

a housing cover installed on the lower housing; and sealing covers installed at the respective rod holes and maintaining sealing between the rod holes and the piston rods.

4. The anti-roll apparatus of claim 3, wherein an air-pressure adjusting valve is installed in the housing cover.

5. The anti-roll apparatus of claim 1, wherein a sealing member is installed between the cylinder housing and the piston rod.

6. The anti-roll apparatus of claim 1, wherein an outer end of the respective push rods is connected to an extension end formed upwardly at an inner end of the lower arm through a ball joint.

7. The anti-roll apparatus of claim 1, wherein an inner end of the respective push rods is connected to a corresponding piston rod of the cylinder through a joint bush.

8. The anti-roll apparatus of claim 1, wherein the compressible fluid is air.

9. An anti-roll apparatus for a vehicle, comprising:

lower arms respectively installed at both sides of a sub frame through hinges;

piston rods connected to respective lower arms through a corresponding push rod;

a cylinder included in the sub frame; wherein the cylinder includes:

a cylinder housing;

a guide wall dividing an interior of the cylinder housing into two chambers and included inside the cylinder housing so that ends of the two chambers fluid-communicate with each other; and pistons slidably included in the respective chambers and connected to the piston rods;

wherein an air-pressure adjustment valve configured to adjust pressure inside the cylinder is installed in the cylinder.

10. The anti-roll apparatus of claim 9, wherein the cylinder includes:

rod holes in which the respective piston rods are inserted, wherein the rod holes are provided with the piston rods and sealing covers configured to maintain sealing between the piston rods and the rod holes.

11. The anti-roll apparatus of claim 9, wherein each of the push rods is connected to an extension end formed at an inner end of a corresponding lower arm through a ball joint.

12. The anti-roll apparatus of claim 9, wherein the corresponding push rod is connected to a corresponding piston rod through a joint bush.

* * * * *